United States Patent
Ko

(10) Patent No.: US 7,177,509 B2
(45) Date of Patent: Feb. 13, 2007

(54) LARGE-SCALE IMAGE DISPLAY APPARATUS USING OPTICAL FIBER

(76) Inventor: Jung Chan Ko, 136-201ho, Dongseorichvilla 409 Sinlim-domg, Gwanak-gu Seoul (KR)

(*) Notice: Subject to any disclaimer, the term of this patent is extended or adjusted under 35 U.S.C. 154(b) by 0 days.

(21) Appl. No.: 10/529,783

(22) PCT Filed: Sep. 29, 2003

(86) PCT No.: PCT/KR03/01985

§ 371 (c)(1),
(2), (4) Date: Mar. 30, 2005

(87) PCT Pub. No.: WO2004/030354

PCT Pub. Date: Apr. 8, 2004

(65) Prior Publication Data

US 2006/0008217 A1 Jan. 12, 2006

(30) Foreign Application Priority Data

Sep. 30, 2002 (KR) ............... 10-2002-0059223

(51) Int. Cl.
*G02B 6/04* (2006.01)
*G02B 6/06* (2006.01)

(52) U.S. Cl. ............ 385/115; 385/901; 385/54; 385/119

(58) Field of Classification Search ............ None
See application file for complete search history.

(56) References Cited

U.S. PATENT DOCUMENTS 3,590,248 A * 6/1971 Chatterton, Jr. ............. 398/91
3,834,803 A * 9/1974 Tsukada ....................... 355/1
4,923,276 A * 5/1990 Wells ....................... 250/206.2
5,974,215 A * 10/1999 Bilbro et al. ............... 385/116

* cited by examiner

*Primary Examiner*—Rodney Bovernick
*Assistant Examiner*—Omar Rojas
(74) *Attorney, Agent, or Firm*—Maria Parrish Tungol

(57) ABSTRACT

The present invention discloses an image display apparatus using optical fiber in which moving images projected from a projector can be transferred to a screen through an optical fiber bundle with a high-definition image quality. An object of the present invention is to improve message transfer effect of various information pieces such as advertisement, by employing a connector which can selectively control a magnification of an image to be displayed while decreasing the sizes of a condensing member or a liquid crystal panel. In order to achieve the above object, a large-scale image display apparatus using optical fiber, comprising a condensing member for condensing light to be emitted from an illuminating device (18) and sending the light to an image receiving surface of an optical fiber bundle, and an image display device for inputting an image to the image receiving surface of the optical fiber bundle, is provided, where the large-scale image display apparatus according to the present invention is characterized by comprising: a plurality of optical fiber bundles having sectional areas different from each other; and a connector for connecting the plurality of optical fiber bundles and enabling magnification controls of a first lens and a second lens provided at the inside thereof.

7 Claims, 7 Drawing Sheets

LARGE-SCALE IMAGE DISPLAY APPARATUS USING OPTICAL FIBER

BACKGROUND OF THE INVENTION

1. Field of the Invention

The present invention relates to a large-scale image display apparatus using optical fiber, and more particularly, to a large-scale image display apparatus using optical fiber available widely in various fields such as a home, a broadcasting station, a commercial advertisement, a large conference room, a guest hall of a financial institution such as a bank, an exhibition, and so on.

2. Description of the Related Art

As well known, production cost of a large-size television used indoors a manufacture cost increases rapidly with increase of screen size thereof, and in addition, the increase of screen size is limited technologically. As another large-scale image display apparatus, a PDP screen is known, but it has problems that the manufacture facilities thereof are immense, it is not suitable for implementing a large size screen because a gap between screens becomes 5 cm to 10 cm when several screens are assembled for implementing a large size screen, and the brightness thereof is insufficient.

Further, a rear projection television and a projector can provide a large size screen having a high resolution, but there are problems that the volume thereof is large, the image quality is deteriorated due to large brightness difference between a center and an edge portion of a screen, and expensive lamps which are core parts should be periodically replaced.

On the other hand an LED screen is used as a large-scale image display apparatus for outdoor advertisement. This LED screen can display images with a high brightness, but the price is very high, so that it is not used widely.

In consideration of the problems described above, the present applicant has proposed an image display apparatus capable of displaying images with a high definition and a high brightness, disclosed in Korean Utility Model Registration Application No. 2001-0031548 (entitled to "An Image Display Apparatus Using Optical Fiber", hereinafter, referred to as "earlier application").

According to the earlier application, a liquid crystal panel 107 of which a decoder card 106 is connected to an image receiving surface 103 of an optical fiber bundle 101 having a display surface 102 and the image receiving surface 103 is provided, a condensing member 104 for condensing light emitted from an illuminating device 108 and sending the light to the image receiving surface 103 is formed out of an optical fiber bundle 105, longitudinal uneven portions are formed in the display surface 102 to widely disperse a display image, and uneven portions forming concentric circles is formed in the image receiving surface 103 to condense a light source.

This image display apparatus 100 makes an image be formed in the liquid crystal panel 107 by sending image signals to the liquid crystal panel 107 image signals from the decoder card 106, makes the light emitted from the illuminating device 108 be transferred to the image receiving surface 103 through the condensing member 104, so that the light and the image are transferred to the display surface 102 from the image receiving surface 103 to display the image in the display surface 102. In this case, by using optical fiber excellent in light transfer efficiency as a transfer medium, the images are not missed in the course of transferring images and a definition degree of image is improved.

On the contrary, since this earlier application employs a method of enlarging a screen by using arrangement density of the optical fiber bundle 105, enlargement of the size of the display surface 102 is limited, and thus the earlier application leaves a room to improve.

That is, since image signals of the decoder card 106 are transferred through the optical fiber bundle 101 to the display surface 102 and are displayed in the display surface 102, the number of optical fiber in the optical fiber bundle 101 should be increased for enlargement of the size of the display surface 102, and as a result, the size of the image receiving surface 103 is also increased.

Therefore, since the enlarged condensing member 104 and liquid crystal panel 107 should be provided in the image receiving surface 103 and specifically the number of pixels and the definition degree of the liquid crystal panel 107 should be increased, there is a problem that a total size and manufacture cost of the apparatus are increased.

SUMMARY OF THE INVENTION

The present invention is contrived to solve the above problems, and it is an object of the present invention to provide a large-scale image display apparatus capable of selectively enlarging and controlling magnifications of images to be displayed without increasing sizes of a condensing member or a liquid crystal panel.

In order to accomplish the above object, a large-scale image display apparatus using optical fiber, comprising a condensing member for condensing light to be emitted from an illuminating device and sending the light to an image receiving surface of an optical fiber bundle, and an image display device for inputting an image to the image receiving surface of the optical fiber bundle, is provided, the large-scale image display apparatus according to the present invention being characterized by comprising: a plurality of optical fiber bundles having sectional areas different from each other; and a connector for connecting the plurality of optical fiber bundles and enabling magnification controls of a first lens and a second lens provided at the inside thereof.

Therefore, according to the present invention, since a magnification of the display surface of the optical fiber bundles in which advertisements or various information pieces provided with moving images are displayed can be selectively controlled, it is possible to effectively transfer messages such as the advertisements or various information pieces.

BRIEF DESCRIPTION OF THE DRAWINGS

The aforementioned aspects and other features of the present invention will be described in the following description, taken in conjunction with the accompanying drawings, wherein.

REFERENCE NUMERALS OF IMPORTANT PARTS IN THE DRAWINGS

Figure 1:
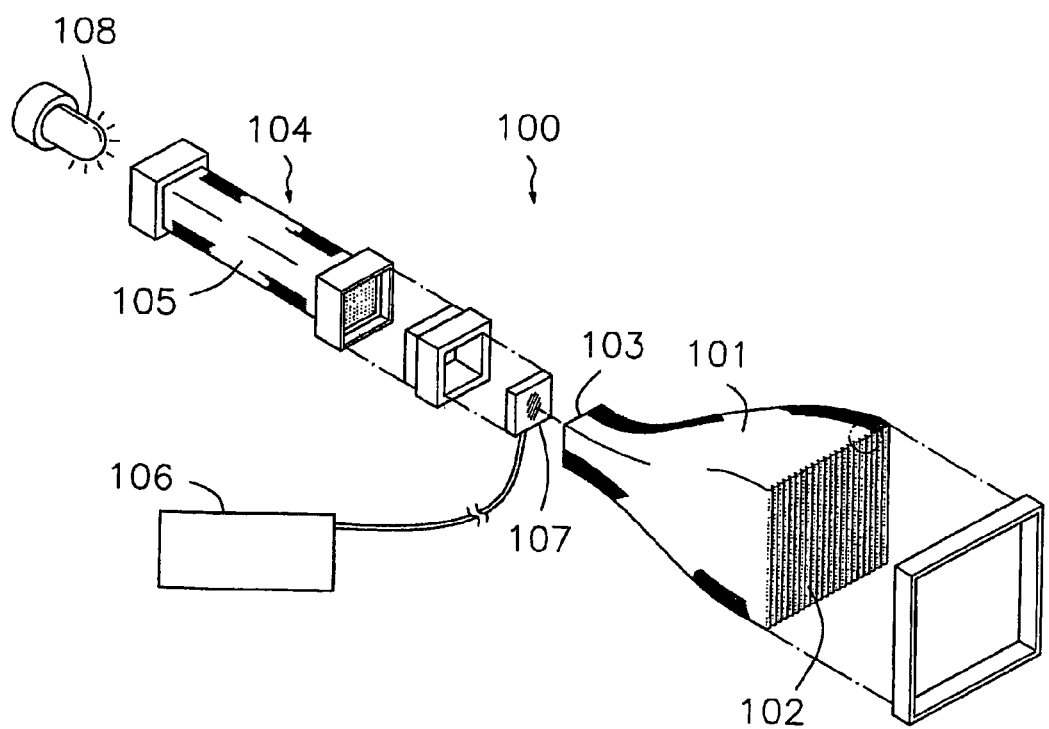
FIG. 1 is an explanatory view illustrating a construction of a conventional image display apparatus using optical fiber.

10: image display device
11: optical fiber bundle
12: image receiving surface
13: display surface
14: decoder card
15: liquid crystal panel
16: illuminating device
17: condensing member
18: DLP projector
19: LCD projector
20: position moving means
21: connector
24: body
25: long hole
26: first lens
27: second lens
28: projection
29: rotation ring
30: spiral groove

DETAILED DESCRIPTION OF PREFERRED EMBODIMENTS

Figure 2:
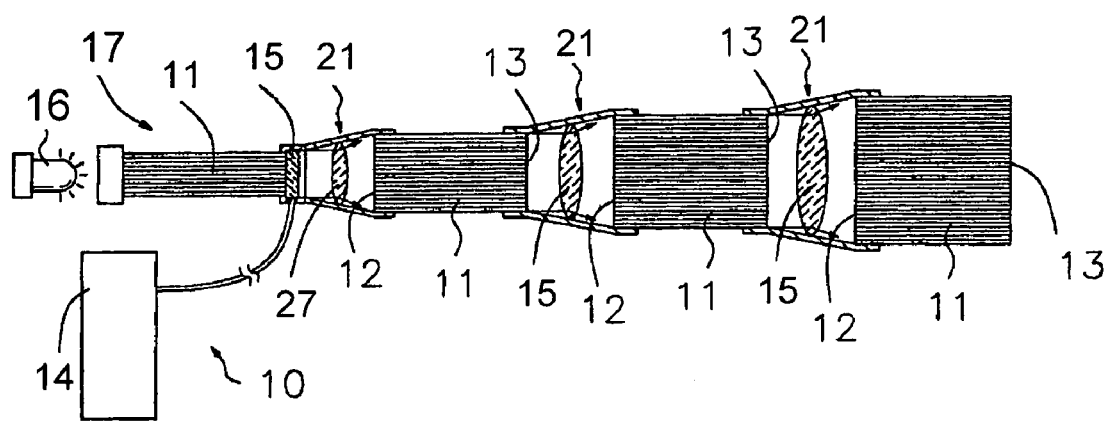
FIG. 2 is an explanatory view illustrating a construction of an image display apparatus using optical fiber according to the present invention.

FIG. 2 is an explanatory view illustrating a construction of an image display device using optical fiber according to the present invention.

In the present invention, at least one optical fiber bundle 11 is provided, but the plural optical fiber bundles 11 are different in sectional area from each other. In addition, a connector 21 for connecting these different optical fiber bundles 11 is provided.

At that time, the connector 21 has a first lens 26 fixed to one end of inside of a body 24 in which a long hole 25 is formed at one side thereof, and a second lens 27 fixed to the other end. A projection 28 is formed at an outer peripheral edge of the second lens 27, and the projection 28 is inserted into the long hole 25.

Further, the above body 24 is inserted into a rotation ring 29 in which a spiral groove 30 is formed at the inside thereof, and an end of the projection 28 inserted into the long hole 25 is inserted at the spiral groove 30.

Furthermore, a decoder card 14 connected to a liquid crystal panel 15, and a condensing member 17 formed out of the optical fiber bundles, for condensing light emitted from an illuminating device 16 and sending the light to an image receiving surface 12, are provided.

In the present invention, the above liquid crystal panel 15 is provided close to one side of the condensing member 17, and the illuminating device 16 is provided at the opposite side of the condensing member 17.

Also, using the connector 21, the optical fiber bundles 11 having smallest diameter is connected to one side of the liquid crystal panel 15 and the condensing member 17, wherein the plural optical fiber bundles 11 are connected using different-size connectors 21, to gradually increase sectional areas thereof.

In the present invention constructed like above, the image signals transferred to the liquid crystal panel 15 from the decoder card 14 are sent together with the light emitted from the illuminating device 16 and is displayed in the display surface 13 of the optical fiber bundle 11. Then, they are enlarged by means of the connector 21, irradiated to the image receiving surface 12 of other optical fiber bundle 11, so that an enlarged image is displayed in the display surface 13. As a result, various advertisements or various information pieces can be seen.

That is, the light from the illuminating device 16 is irradiated through the condensing member 17 to the liquid crystal panel at the same time as when the image signals from the decoder card 14 is sent to the liquid crystal panel 15, and they are enlarged through the first lens 26 and the second lens 27 of the connector 21 and is transferred to the image receiving surface 12 of other optical fiber bundle 11, so that the enlarged image is transferred to the image receiving surface 12 and is displayed in the display surface 13 at the other end. In this way, the image is enlarged through the first and second lenses 26, 27 of the connector 21 to form the image in the image receiving surface 12 of the optical fiber bundle 11 of which diameter is more enlarged, and the enlarged image is displayed again in the display surface 13 at the other end, so that the image enlarged into a desired magnification can be displayed through the optical fiber bundle 11 provided at the final stage. According to the present invention, it is possible to obtain the image enlarged into the desired magnification, by adjusting the number of optical fiber bundles 11 having sectional areas different from each other and the magnifications of the first and second lenses 26, 27, and in addition, even though the magnification is increased by increasing the number of optical fiber bundles 11, loss of light due to the connector 21 hardly occurs, so that a high-definition image can be obtained.

Therefore, even though a low-cost and small-size liquid crystal panel 15 and illuminating device 16 are employed, a high-definition and sufficiently-enlarged image can be provided.

Figure 3:
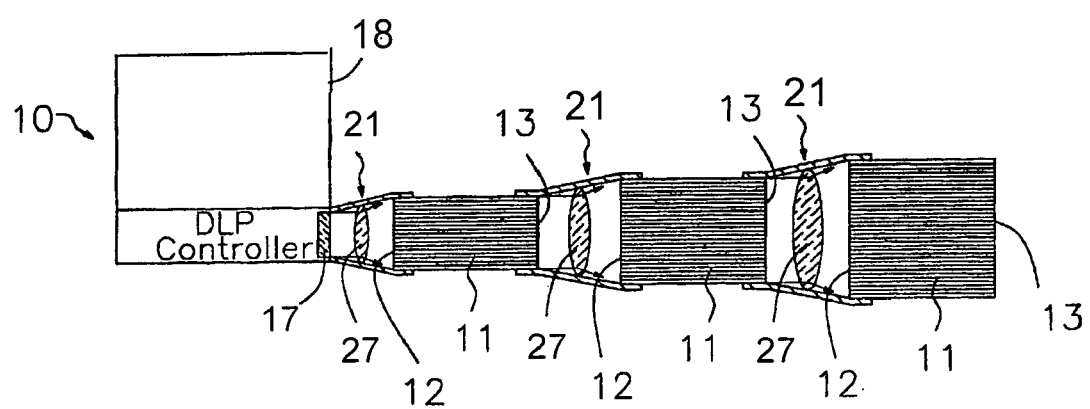
FIGS. 3 to 5 are explanatory views illustrating other embodiments of the image display apparatus using optical fiber according to the present invention.

On the other hand, FIG. 3 illustrates an example in which the decoder card 14 and the liquid crystal panel 15 of the image display device 10 according to the present invention are replaced with a DLP (Digital Light Processing) projector 18. Since the DLP projector 18 comprises a DMD (Digital Micromirror Device), it has an excellent light efficiency, and provides a fine and clear image having an improved color sense.

Figure 4:
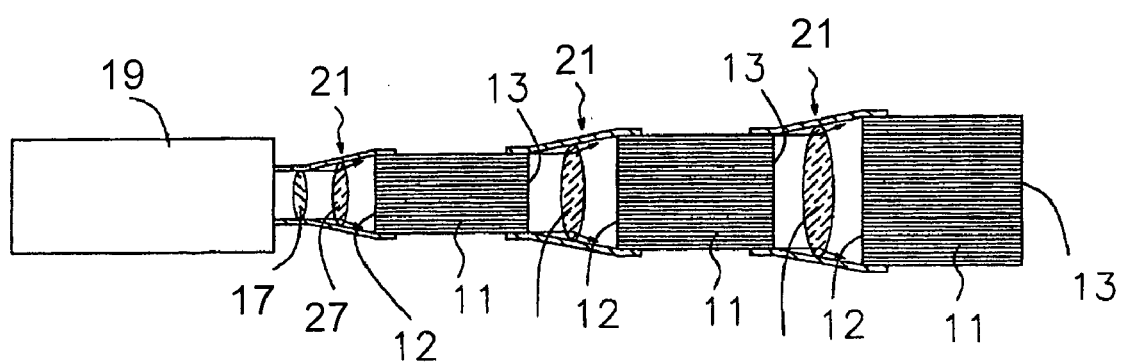

As shown in FIG. 4, of course, the image display device 10 according to the present invention can be replaced with an LCD Projector widely used.

Figure 5:
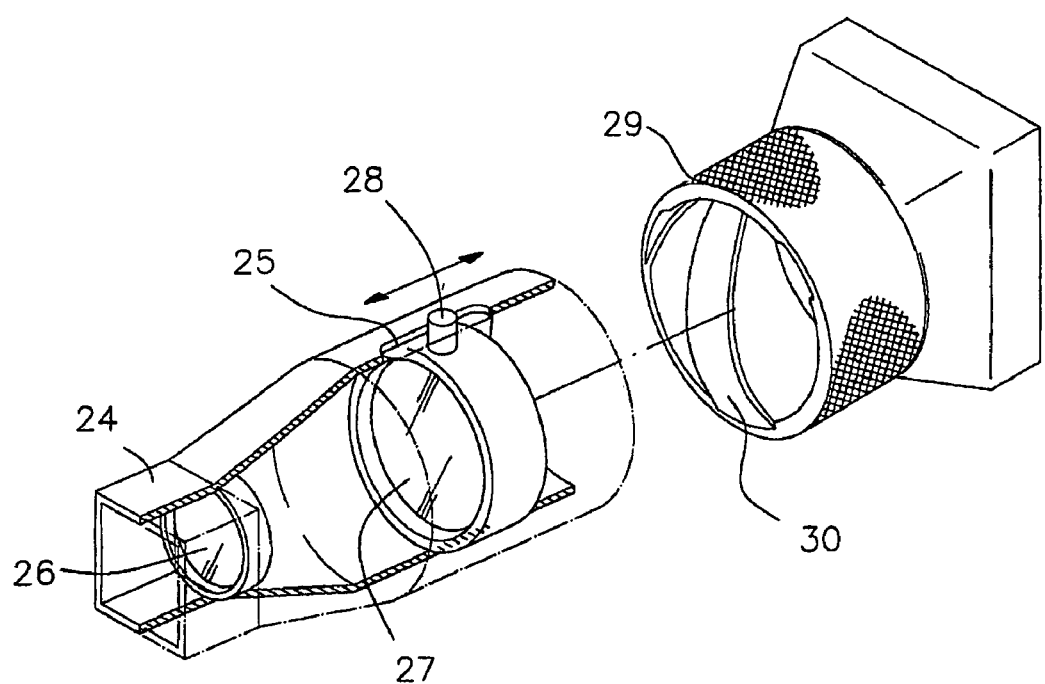

In addition, in the present invention, when the rotation ring 29 is rotated as shown in FIG. 5, the above rotation ring 29 is rotated at its original position, and the projection 28 inserted into the spiral groove 30 of the rotation ring 29 is moved along the spiral groove 30, so that the second lens 27 is moved.

In this way, the magnification can be adjusted, and the movement of the second lens 27 is made within the range of the long hole 25.

Figure 6:
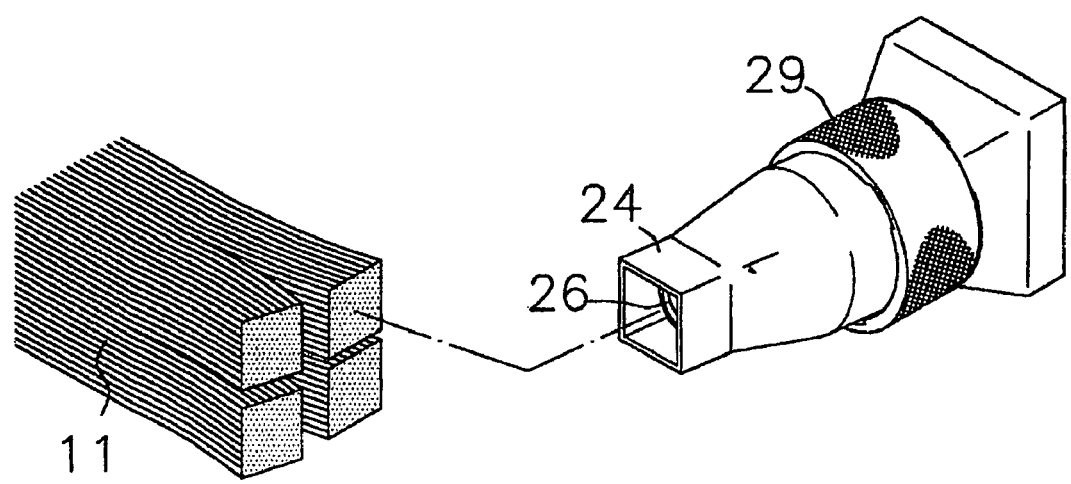
FIGS. 6 and 7 are explanatory views illustrating other embodiments of the image display apparatus using optical fiber according to the present invention.

Further, FIG. 6 shows an example where a large-size screen is implemented using a plurality of optical fiber bundles 11 having the same sectional area. Here, by repeating a process of dividing a display surface 13 of an optical fiber bundle 11 into multiple pieces and connecting each divided piece of the display surface 13 to another optical fiber bundle 11 through the connector 21, a high-definition and large-size screen can be implemented at the final stage.

Figure 7:
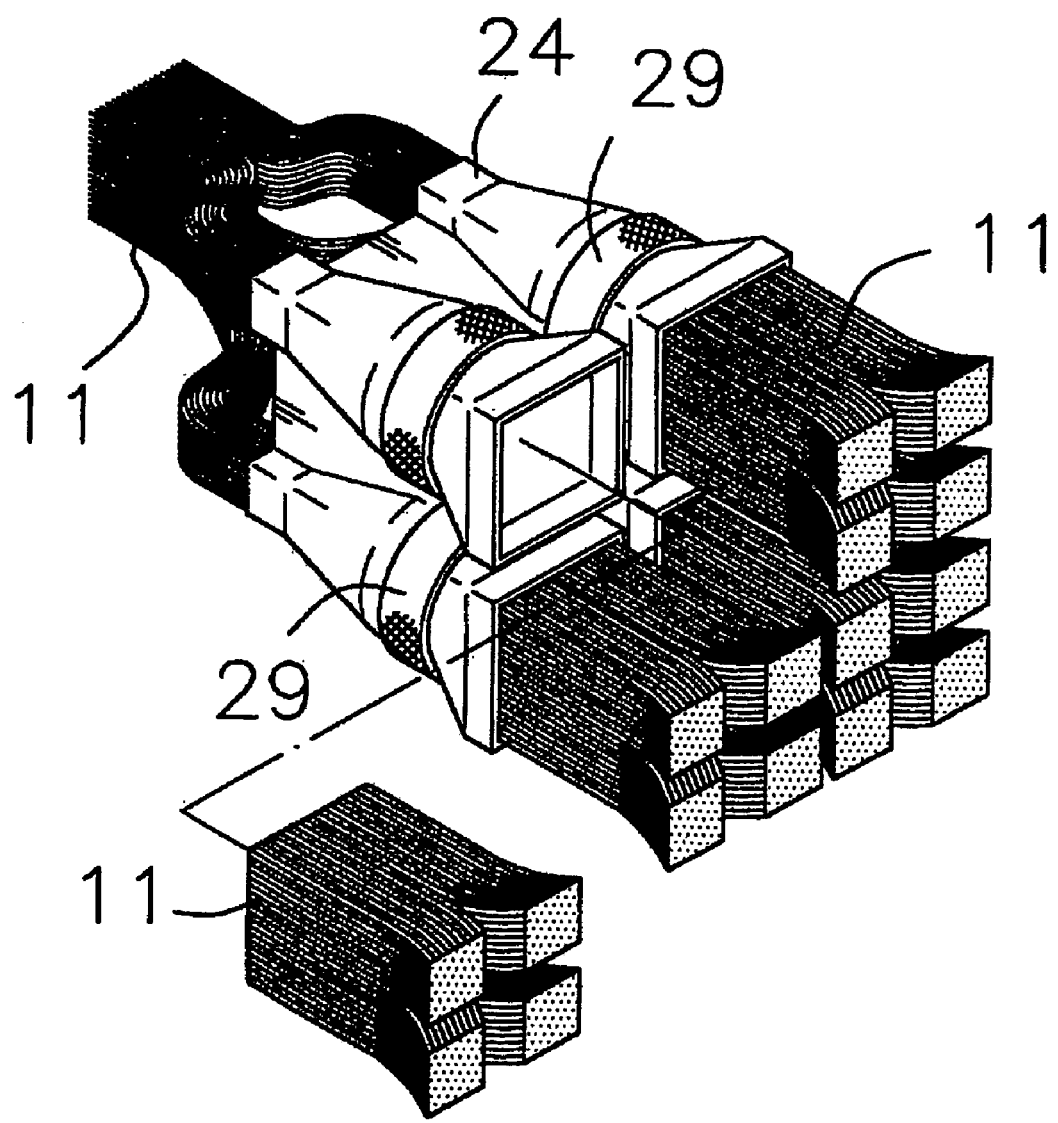

At that time, the optical fiber bundles 11 may be connected by providing each connector 21 in the divided pieces of the display surface 13, and the plural optical fiber bundles 11 may be also connected using one connector 21, as shown in FIG. 7, by dividing the body 24 of the connector 21 into the same number of pieces as the divided pieces of the display surface 13 and providing the first and second lenses 26, 27 and the rotation ring 29 at each divided pieces of the body 24.

INDUSTRIAL AVAILABILITY

As mentioned above, according to the present invention, it is possible to easily implement a large size screen required by consumers without any technical trouble by employing the optical fiber bundles and the connector having the necessary number of lenses, and in addition, since the decrease of brightness and the decrease of definition during the extension process do not occur with increase of the screen size and there is no space between the screens, an actually natural screen can be obtained. Further, according to the present invention, since the screen magnification displaying various information pieces such as advertisement in a final display surface of the optical fiber bundle of the conventional large size screen can be selectively controlled into expansion, it is possible to conveniently and effectively transfer various information pieces such as advertisement.

Furthermore, according to the present invention, since the production cost does not increase rapidly with increase of the screen size, it is widely available.

What is claimed is:

1. A large-scale image display apparatus using optical fiber, comprising a condensing member (17) for condensing light to be emitted from an illuminating device (18) and sending the light to an image receiving surface (12) of an optical fiber bundle (11), and an image display device (10) for inputting an image to the image receiving surface (12) of the optical fiber bundle (11), the large-scale image display apparatus being characterized by comprising:

a plurality of optical fiber bundles (11) having sectional areas different from each other; and connectors (21) for connecting the plurality of optical fiber bundles (11) and enabling magnification control of first and second lenses (26,27) provided at the insides thereof.

2. The large-scale image display apparatus using optical fiber according to claim 1, wherein the image display device (10) comprises a decoder card (14) and a liquid crystal panel (15).

3. The large-scale image display apparatus using optical fiber according to claim 1, wherein the image display device (10) is a DLP (Digital Light Processing) projector (18) comprising a DMD (Digital Micromirror Device).

4. The large-scale image display apparatus using optical fiber according to claim 1, wherein the image display device (10) is an LCD projector (19).

5. The large-scale image display apparatus using optical fiber according to claim 1, wherein each of the connectors (21) comprise a body (24) provided with a long hole (25) at one side thereof, the first lens (26) fixed to an inside of the body (24), the second lens (27) having a projection (28) to be inserted into the long hole (25), and a rotation ring (29) provided with a spiral groove at the inside thereof.

6. The large-scale image display apparatus using optical fiber according to claim 1, wherein a display surface (13) of one optical fiber bundle (11) is divided into multiple pieces, and the plurality of optical fiber bundles (11) are connected to the divided pieces of the display surface (13) through the connectors (21), respectively.

7. The large-scale image display apparatus using optical fiber according to claim 5, wherein the body (24) of one connector (21) is divided into multiple pieces, the first lens (26) and the second lens (27) are provided at each inside thereof, respectively, and the rotation ring (29) is provided at outer peripheral edges of the divided pieces of the body (24), respectively.

* * * * *